United States Patent [19]

[11] 3,866,208

[45] Feb. 11, 1975

Tsuiki et al.

[54] DATA CONTROL ARRANGEMENT FOR A DYNAMIC DISPLAY SYSTEM

[75] Inventors: Takao Tsuiki; Yoshikazu Hatsukano; Kosei Nomiya, all of Tokyo, Japan

[73] Assignee: Hitachi, Ltd., Tokyo, Japan

[22] Filed: Dec. 26, 1972

[21] Appl. No.: 318,652

[30] Foreign Application Priority Data

Dec. 24, 1971 Japan .............................. 46-104583

[52] U.S. Cl. ........................ 340/324 R, 178/69.5 R

[51] Int. Cl. ............................................ G06f 11/08

[58] Field of Search....... 340/168 S, 324 R, 261 EL, 340/324 M, 378 R; 178/69.5 R

[56] References Cited

UNITED STATES PATENTS

| | | | |
|---|---|---|---|
| 3,225,342 | 12/1965 | Clark | 340/168 S |
| 3,586,776 | 6/1971 | Salava | 178/69.5 R |
| 3,591,720 | 7/1971 | Othmer | 178/69.5 R |
| 3,648,237 | 3/1972 | Frey, Jr. et al. | 178/69.5 R |

*Primary Examiner*—John W. Caldwell
*Assistant Examiner*—Marshall M. Curtis
*Attorney, Agent, or Firm*—Craig & Antonelli

[57] ABSTRACT

A dynamic display system comprising an OR gate circuit to which is supplied output signals derived from corresponding stages of a plurality of registers. A drive circuit drives a display device in response to the output signals from the OR gate circuit. The duty cycle of a drive signal is enhanced, to increase the brightness of the display device.

10 Claims, 2 Drawing Figures

DATA CONTROL ARRANGEMENT FOR A DYNAMIC DISPLAY SYSTEM

BACKGROUND OF THE INVENTION

1. Field of the Invention

The present invention relates to a circuit for displaying signals stored in series connected registers for use in an electronic desk computer etc., and more particularly to a dynamic display system which lights up a display device in a time sharing manner.

2. Description of the Prior Art

In general, both 2-register systems and 3-register systems have been employed for operations in an electronic desk computer and the like. Although the former has a small number of registers, in order to perform multiplication and division, it is necessary that an intermediate calculated result and operands be stored in one register. As a consequence, the number of digits of the operand which can be handled is naturally restricted to a large extent with respect to the number of memory digits of one register. On the other hand, the 3-register system makes improvements thereon.

At first, a parallel 3-register system was used in which three registers were arranged in parallel and in which the calculated result was kept in one register. The parallel 3-register system requires various control gate circuits for shifting an output signal from an adder effecting an operation to a calculated-result storing register separate from the two registers in which two operands are stored; for feeding into the adder the intermediate calculated result stored in the calculated-result storing register, so as to carry out repetition of the addition and subtraction operations; and for shifting the final calculated result stored in the calculated-result storing register to that one of the two registers whose stored contents are fed into a display circuit.

It is the series-parallel register system that makes it possible to dispense with the control gate circuits. In this system, two registers are used in series, while one register is arranged in parallel with the series registers. Operands are stored in one of the two registers, and in the parallel register. An intermediate calculated result and a final calculated result are stored in the other of the two registers. Display signals are always derived from the series-connected registers.

Description will now be made with reference to FIG. 1 of a prior-art dynamic display system which is associated with an arithmetic circuit using series-parallel registers.

FIG. 1 is a schematic block diagram of a prior-art dynamic display system applied to an operating system employing series-parallel registers. In the figure, $R_{x1}$ and $R_{x2}$ designate series-connected shift registers, each of which has a capacity for storing, for example, 8 digits of the binary-coded decimal number. $R_y$ indicates a shift register for storing the first operand, which has the same memory capacity as the shift register $R_{x2}$. Control gate circuits connected before and after the shift registers are omitted for the sake of convenience in explanation. AD represents an adder to which an output of the shift register $R_{x2}$ and an output of the shift register $R_y$ are supplied. A feedback line FL serves to feed an output of the adder AD back to the input side of the shift register $R_{x1}$. Shown at G is a gate circuit which opens a gate by means of a predetermined timing pulse signal $t_{p0}$, to supply the lowest digit signal of the shift register $R_{x2}$ to a driving system DS for a display device DP. M designates a memory circuit, DC designates a decoder circuit and DR designates a driver circuit; and, these circuits M, DC and DR constitute the driving system DS for the display device DP.

With such a construction, when information is read out of the shift register $R_{x2}$ by the timing pulse signal $t_{p0}$ and a driving signal is supplied to the display device, the duty cycle of the driving signal applied to the display device is short, and hence, the repetitive lighting time of the display device becomes short. As a result, flickering arises, and the brightness of the display device DP is disadvantageously weakened.

SUMMARY OF THE INVENTION

It is therefore an object of the present invention to provide a dynamic display system which improves the duty cycle of the driving signal so as to increase the brightness of the display device.

PREFERRED EMBODIMENT OF THE INVENTION

The invention will be described hereunder in connection with an embodiment of the invention.

Figure 1:
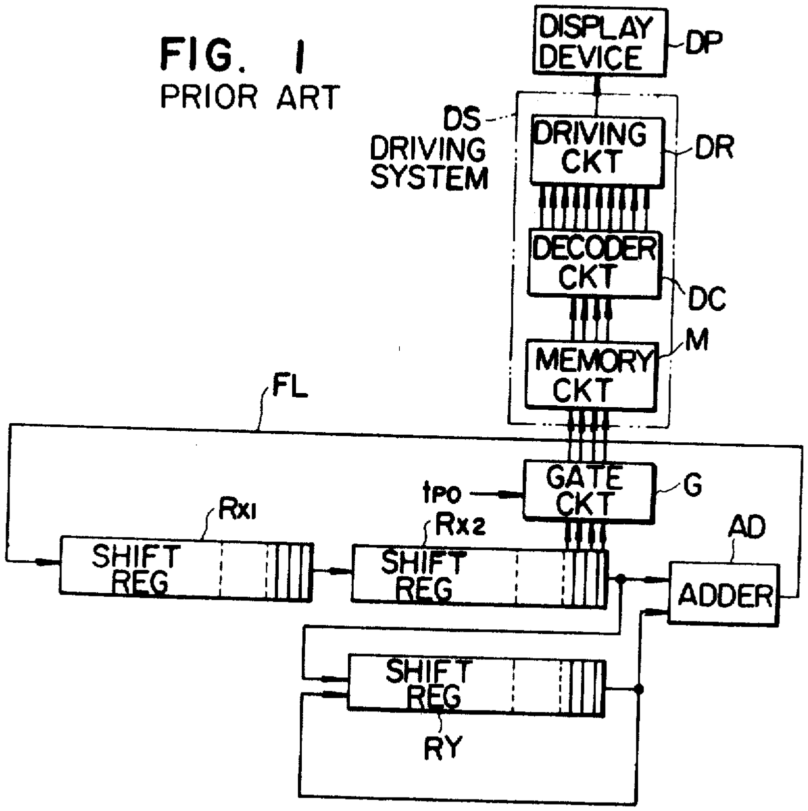
FIG. 1 PRIOR ART
FIG. 1 is a schematic block diagram showing an example of a prior-art dynamic display system.
Figure 2:
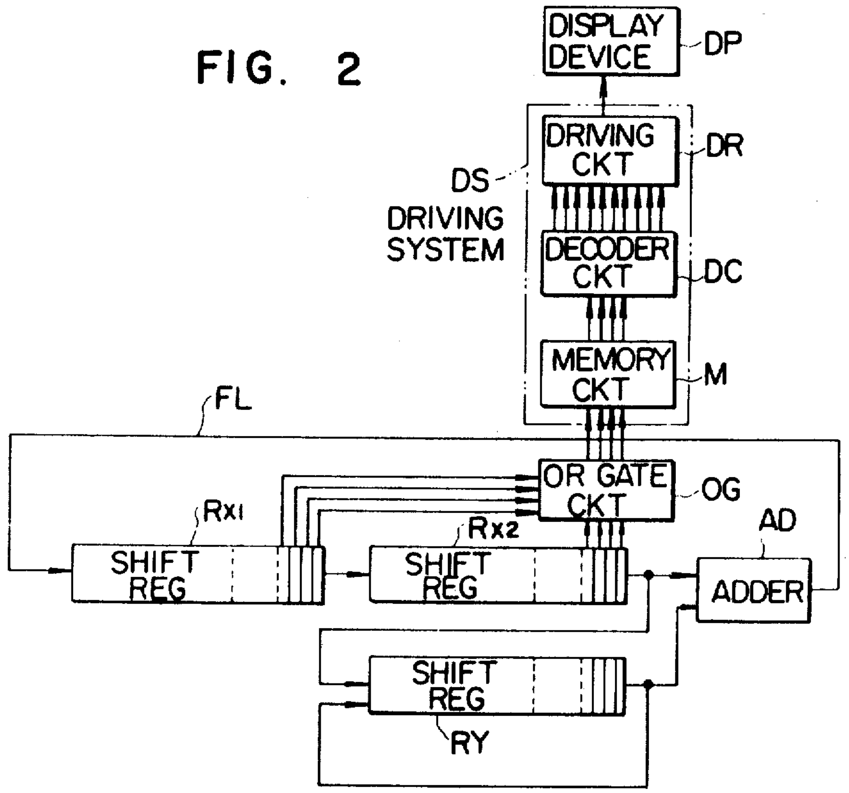
FIG. 2 is a block diagram showing an embodiment of a dynamic display system according to the present invention.

FIG. 2 illustrates the embodiment of a dynamic display system according to the present invention. In the figure, elements corresponding to those in FIG. 1 are represented by the same symbols. OG indicates an OR gate circuit which supplies the lowest digit signals of the shift registers $R_{x1}$ and $R_{x2}$ to the driving system DS for the display device DP. As an example, a signal of a binary-coded decimal number is fed to the OR gate OG from the shift register $R_{x1}$ or $R_{x2}$. More specifically, signals of 4 bits are successively fed to the OR gate OG in parallel. The OR gate OG is controlled so as to be opened by a predetermined timing pulse, for example, a pulse (bit pulse) which is generated at every digit of the binary-coded decimal number. Accordingly, the 4-bit signals are simultaneously provided from the OR gate. Instead of controlling the opening and closure of the OR gate OG by the use of the bit pulses, writing of the memory circuit M may be controlled with the bit pulses. It is also possible to control inputs to the OR gate OG with the bit pulses and to simultaneously put them into the OR gate.

Herein, the memory capacity of the register $R_{x1}$ is one which includes the memory capacity of a memory circuit for the BCD correction (the so-called δ correction) as contained in the adder AD. Accordingly, if a memory circuit of 4 bits is used for the BCD correction, the memory capacity of the register $R_{x1}$ connected between the adder AD and the register $R_{x2}$ need be by 4 bits less than the memory capacity of the register $R_{x2}$. In the case of a parallel system wherein the first bit - the fourth bit of each digit of a binary-coded decimal number are respectively separated and the respective decimal digits are connected in cascade, and a system wherein only the pure addition of binary numbers is conducted, no correcting circuit is required in the adder. In such cases, the memory capacity of the register $R_{x1}$ connected between the register $R_{x2}$ and the adder AD may be made equal to that of the register $R_{x2}$.

Now, there will be stated the operation of the display system thus constructed. First, the calculating operation of the series-parallel 3-register system will be explained. When the first operand is selected, the operand is entered into the register $R_{x1}$, and is stored by circulating through the registers $R_{x1}$ and $R_{x2}$ and the adder AD. At this time, the number of digits of the operand is equal to the number of memory digits of the register $R_{x1}$ or $R_{x2}$. Therefore, blank information having the same number of digit spaces as the digits of the operand (namely, the same number of memory digits as the register $R_{x1}$ or $R_{x2}$) circulates within the registers $R_{x1}$ and $R_{x2}$ in sequence with the operand.

Next, when an operating instruction, for example, a multiplication instruction, is issued and further the second operand is selected, the first operand previously stored is shifted from the register $R_{x2}$ to the register $R_y$. The second operand is shifted through the register $R_{x1}$ to the register $R_{x2}$, and circulates within the registers $R_{x1}$ and $R_{x2}$ as in the case of the foregoing first operand. Next, when a calculation starting instruction is produced, repetition of the addition of the first operand is carried out by the adder AD. At this time an intermediate calculated result and a number forming the multiplier obtained by subtracting the number of addition operations performed from the second operand are stored in the register $R_{x1}$ and $R_{x2}$, respectively. The intermediate calculated result and the first operand are added by the adder AD. Finally, after the full number of addition operations have been performed, the blank information and the calculated result remain stored in the registers $R_{x1}$ and $R_{x2}$. The first operand is still stored in the register $R_y$.

The form in which the calculated result is displayed, will now be explained for the time after completion of the calculation, as an example.

At the step at which the arithmetic processing has been terminated, the output of the register $R_{x2}$ at the last stage thereof is fed back to the input side of the register $R_{x1}$ at the first stage thereof through the feedback line FL, the output of the register $R_{x1}$ is supplied to the register $R_{x2}$, and thus, the calculated result is circulated within both the registers. At a certain time after the completion of the calculation, the register $R_{x2}$ keeps the calculated result therein, while the register $R_{x1}$ is in the blank state the multiplier having now been reduced to zero. Conversely, after a period of time required for the signal to shift from the foremost stage to the rearmost stage of the register $R_{x1}$ or $R_{x2}$, the calculated result is kept in the register $R_{x1}$, and the register $R_{x2}$ is then in the blank state.

Within the given period of time, the calculated result is written from the rearmost stage of the register $R_{x2}$ through the OR gate OG into the memory circuit M at every digit of the binary-coded decimal number. In the interval, the signal or the calculated result does not appear at the rearmost stage of the register $R_{x1}$. Subsequently, the calculated result is similarly written from the rearmost stage of the register $R_{x1}$ through the OR gate OG into the memory circuit M at each digit. Accordingly, during the period during which the calculated result is circulating within the registers $R_{x1}$ and $R_{x2}$, the signals are fed from the rearmost stages of the registers $R_{x1}$ and $R_{x2}$ via the OR gate OG to the memory circuit M. As stated previously, the rearmost stage of one of the registers is always held in the blank state in this case. Therefore, there is no possibility that, due to derivation of the output signals from both the registers, two signals are mixed to display a calculated result which is different from the correct one.

In this way, the light emitting period of the display device becomes twice as long as in the prior art with a circuit of simple construction. In other words, the duty cycle of the drive signal becomes twice as long as in the prior art. The brightness of the display device is accordingly enhanced.

Although, in the above-described example, description has been made of the time after the completion of the calculation, it will be understandable that, not only the calculated result, but also the second or first operand placed before the calculation is similarly displayed at the high duty cycle.

Although, in the embodiment, the four-bit output signals are taken out in parallel from the respective registers, the invention is not restricted thereto. For example, means may also be provided by which the output signals are derived from the respective registers in series at every bit and are fed into the OR gate, and the series binary-coded signals from the OR gate are converted into four-bit parallel signals by the use of four bit pulses. Furthermore, the output signals of the respective registers need not necessarily be derived from the rearmost stages, but they can be taken out from arbitrary positions by appropriately setting the mutual relation of the output terminals of both the registers. In addition, the outputs may be simultaneously derived from a plurality of digits.

In the embodiment, known gates necessary for the arithmetic processing are omitted for the sake of convenience of explanation.

As described above, with the dynamic display system according to the present invention, the duty cycle is enhanced as compared with that of the prior art, thus enabling an increase in the brightness of the display device.

What we claim is:

1. A dynamic display system comprising a plurality of series connected registers having the same storage capacities, respectively, a feedback circuit which serves to feed-back the output side of the rearmost stage of said series of registers to the input side of the foremost stage of said series of registers, an OR circuit having respective inputs to which respective output signals derived from predetermined corresponding positions in each of said respective registers are supplied, and a drive circuit which drives a display device in response to the output of said OR circuit, whereby the duty cycle of a drive signal applied to said display device is enhanced to raise the brightness of said display device.

2. A dynamic display system as defined in claim 1, wherein the respective inputs of said OR circuit are connected to the last stage of each series connected register, respectively.

3. A dynamic display system as defined in claim 1, wherein said plurality of series connected registers comprise first and second registers connected in series, and further including an adder having one input connected to the output of said second register and an output connected to said feedback circuit.

4. A dynamic display system as defined in claim 3, further including an additional register having its input connected to the output of said second register and an output connected to a second input of said adder, the output of said additional register being connected to the input thereof.

5. A dynamic display system as defined in claim 1, wherein the respective inputs of said OR circuit are connected to corresponding stages of the respective registers.

6. A dynamic display system comprising at least a first and a second shift register each having a plurality of stages;

means for connecting said first and second shift registers in the form of a closed loop;

means for circulating a signal having plural bits through said closed loop;

gate means connected at least to one of the stages of said first shift register and the corresponding one of the stages of said second shift register for gating one bit of said signal out of said one stage of the first shift register at a first time and for gating the same bit of the signal out of the corresponding stage of the second shift register at a second time; and display means for displaying the output of said gate means.

7. The display system of claim 6, wherein the signal circulated through said closed loop represents a binary coded decimal number, said gate means receiving at said first time a 4 bit-output derived from the rearmost 4 bit stages of said first shift register and also receiving at said second time the same 4 bit-output derived from the corresponding rearmost 4 bit stages of said second shift register.

8. A dynamic display system comprising a first and a second shift register each having a plurality of stages;

means for connecting said first and second shift registers in the form of a closed loop;

means for circulating a signal representing a binary coded decimal number through said closed loop with a predetermined cycle period of time;

gate means connected to the rearmost 4 bit stages of said first and second shift registers for gating the first to fourth bit of each digit of said binary coded decimal number sequentially from said rearmost 4 bit stages of said first shift register at a first time and for gating the same first to fourth bit of each digit of said binary coded decimal number sequentially from said rearmost 4 bit stages of said second shift register at a second time spaced from said first time by a period equal to half of said predetermined cycle period of time;

decoder means, responsive to the output of said gate means, for decoding each of the 4 bit binary digits to a signal representing a decimal digit; and display means, responsive to the output of said decoder means, for displaying said decimal number.

9. A dynamic display system comprising first and second registers having the same storage capacities and being connected in series, an adder having one input connected to the output of said second register and an output connected to the input of said first register, a third register having its input connected to the output of said second register and an output connected to a second input of said adder, the output of said third register being connected to the input thereof, an OR circuit having respective inputs connected to corresponding stages of said first and said second registers, and a drive circuit which drives a display device in response to the output of said OR circuit, whereby the duty cycle of a drive signal applied to said display device is enhanced to raise the brightness of said display device.

10. A dynamic display system as defined in claim 9, wherein the respective inputs of said OR circuit are connected to the last stage of each series connected register, respectively.

* * * * *